US009977702B2

(12) United States Patent
Iyer et al.

(10) Patent No.: US 9,977,702 B2
(45) Date of Patent: May 22, 2018

(54) EVENT PROCESSING NETWORKS

(75) Inventors: Sreekanth R. Iyer, Bangalore (IN); Gowdhaman Jayaseelan, Bangalore (IN); Jojo Joseph, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1292 days.

(21) Appl. No.: 12/623,673

(22) Filed: Nov. 23, 2009

(65) Prior Publication Data

US 2011/0126201 A1    May 26, 2011

(51) Int. Cl.
   *G06F 9/54* (2006.01)

(52) U.S. Cl.
   CPC ........ *G06F 9/542* (2013.01); *G06F 2209/544* (2013.01)

(58) Field of Classification Search
   CPC ........................... G06F 9/542; G06F 2209/544
   USPC ......................................................... 719/318
   See application file for complete search history.

(56) References Cited

U.S. PATENT DOCUMENTS

| 7,092,984 B2 | 8/2006 | Nishigaya et al. |
| 7,143,410 B1 | 11/2006 | Coffman et al. |
| 7,321,908 B2 | 1/2008 | Barabash et al. |
| 8,234,329 B2 | 7/2012 | Iyer et al. |
| 8,296,412 B2 | 10/2012 | Secor et al. |
| 8,694,576 B2 | 4/2014 | Iyer et al. |
| 2004/0128329 A1 | 7/2004 | Ben-Yitzhak et al. |
| 2005/0027845 A1 | 2/2005 | Secor et al. |
| 2005/0273847 A1 | 12/2005 | Patrick et al. |
| 2005/0278487 A1 | 12/2005 | Blandy |
| 2008/0301135 A1* | 12/2008 | Alves ................ G06F 17/30442 |
| 2009/0070786 A1 | 3/2009 | Alves et al. |

(Continued)

FOREIGN PATENT DOCUMENTS

| JP | 2007515706 A | 6/2007 |
| JP | 2011113566 A | 6/2011 |
| KR | 20110057070 A | 5/2011 |

OTHER PUBLICATIONS

BEAWebLogic Event Server—WebLogic Event Server Administration and Configuration Guide; Jul. 2007; 108 pages.*

(Continued)

*Primary Examiner* — S Sough
*Assistant Examiner* — Kimberly Jordan
(74) *Attorney, Agent, or Firm* — Cuenot, Forsythe & Kim, LLC

(57) ABSTRACT

A hybrid event processing network (EPN) having at least one event processing agent (EPA) consists of a first set of EPAs defined declaratively and a second set of EPAs defined dynamically at runtime via an interface. Deploying the hybrid EPN includes loading the hybrid EPN, constructing an EPN structure, and creating indexes of nodes of the EPN structure. Deploying the hybrid EPN further includes representing an event in a hybrid EPN, and, in response to the event occurrence at an event source, receiving a notification from the hybrid EPN based on the event, and publishing the notification in an event channel. Embodiments of the invention includes propagating the event received within the hybrid EPN, determining a subsequent EPA associated with the event within the hybrid EPN, and propagating the event to the subsequent EPA in the hybrid EPN until the last element of the hybrid EPN is reached.

20 Claims, 5 Drawing Sheets

(56) References Cited

U.S. PATENT DOCUMENTS

2011/0088035 A1    4/2011   Etzion et al.
2011/0125825 A1    5/2011   Iyer et al.
2012/0192192 A1    7/2012   Iyer et al.

OTHER PUBLICATIONS

Guy Sharon and Opher Etzion; Event Processing Network—A Conceptual Model; Sep. 2007; 9 pages.*
Towards a Declarative Language for Parallel and Concurrent Programming, Published : 1995, http://citeseerx.ist.psu.edu/viewdoc/summary?doi=10.1.1.39.942, Abstract; 3 pages.
U.S. Appl. No. 13/428,238 Non-Final Office Action, dated Jul. 12, 2013, 9 pg.
Eguchi, A. et al., "ECJ Event Delivery Framework in Java, for Java," In Software Technologies Toward the Network Era, Toshiba Review, vol. 53, No. 8, Toshiba Corporation, 1998, 6 pg.

* cited by examiner

EVENT PROCESSING NETWORKS

CROSS-REFERENCE TO RELATED APPLICATIONS

This application is related to the application entitled "Event Processing", Ser. No. 12/623,595, filed Nov. 23, 2009, the contents of which are herein incorporated by reference in entirety.

BACKGROUND

An event driven (ED) system is capable of sensing and responding to events by following the decoupled architecture. An Event Processing Network (EPN) is a representation of execution of an ED system. The EPN employs techniques such as detection of complex patterns of a number of events, event correlation and abstraction, event hierarchies, and relationships between events such as causality, membership, and timing, and event-driven processes.

Typically an EPN consists of a set of event processing agents (EPA) or nodes interconnected by communication channels. An EPN executes event processing by creating and selecting dynamic paths among these EPAs based on the need of the business. If there is only one producer of the event and only one receiver of the event, the identification of the path among the EPAs is trivial. The issue is more involved if, based on the event processing requirements, the EPN needs to be modified dynamically. The routing decision at a given node is made based on event information, processing result at the node and/or consulting an external resource such as, for example, an event registry and repository for details.

In the decoupled architecture of the typical ED system, the event producers have no prior knowledge of the event processing agents or event consumers. Typically, an EPN which consists of a set of EPAs may be dynamically wired as and when events arrive or events are received at the EPN. The route taken by any particular event depends on the type of the event, its associated contents and associated metadata. Each of the EPAs participating in the EPN can alter the sequence in which the EPAs are invoked inside the EPN at runtime.

BRIEF SUMMARY

Embodiments of the invention relate to a method, a system and a computer program to construct a hybrid event processing network (hybrid EPN).

According to an embodiment of the invention, a method to construct a hybrid EPN is disclosed. The hybrid EPN has at least one event processing agent (EPA). The hybrid EPN is where a first set of EPAs is defined declaratively and a second set of EPAs is defined dynamically at runtime via an interface.

According to a further embodiment, an Event Router (ER) is defined, and the ER also includes an ER interface.

According to yet a further embodiment, an Event Processing Context (EPC) is defined. The EPC includes a pointer to the EPA of the hybrid EPN.

According to a further embodiment of the invention, an EPA interface is defined for at least one EPA of the hybrid EPN.

According to a further embodiment of the invention, deploying the hybrid EPN, includes the steps of loading the hybrid EPN, constructing an EPN structure, and creating indexes of nodes of the EPN structure. The method of deploying the hybrid EPN further includes the steps of representing an event in a hybrid EPN in response to the event occurrence an event source, receiving a notification from the hybrid EPN based on the event, and publishing the notification in an event channel. The method of deploying the hybrid EPN further includes the steps of propagating the event received within the hybrid EPN, determining a subsequent EPA associated with the event within the hybrid EPN, and propagating the event to the subsequent EPA in the hybrid EPN until the last element of the hybrid EPN is reached.

According to yet a further embodiment of the invention, an event processing network (EPN) includes a first set of EPAs configured declaratively, and a second set of EPAs configured to be dynamically modified at runtime, and a resulting combination of the first set of EPA and the second set of EPA forms a hybrid EPN.

According to a further embodiment of the invention, the hybrid EPN further includes an event router (ER), an ER interface configured to dynamically modify the second set of EPAs at runtime, an event processing context (EPC) configured to include a pointer to the EPA, and an EPA interface for at least one EPA of the hybrid EPN.

A further aspect of the invention discloses a computer program to construct a hybrid event processing network (EPN) is disclosed. The hybrid EPN has at least one event processing agent (EPA) and the hybrid EPN consists of a first set of EPA defined declaratively and a second set of EPA defined dynamically at runtime via an interface.

Yet a further aspect of the invention discloses deployment of the hybrid EPN for event processing. Other aspects and embodiments are also disclosed.

BRIEF DESCRIPTION OF THE SEVERAL VIEWS OF THE DRAWINGS

Embodiments of the invention are described in detail below, by way of example, with reference to the following schematic drawings, where.

DETAILED DESCRIPTION

Figure 1:
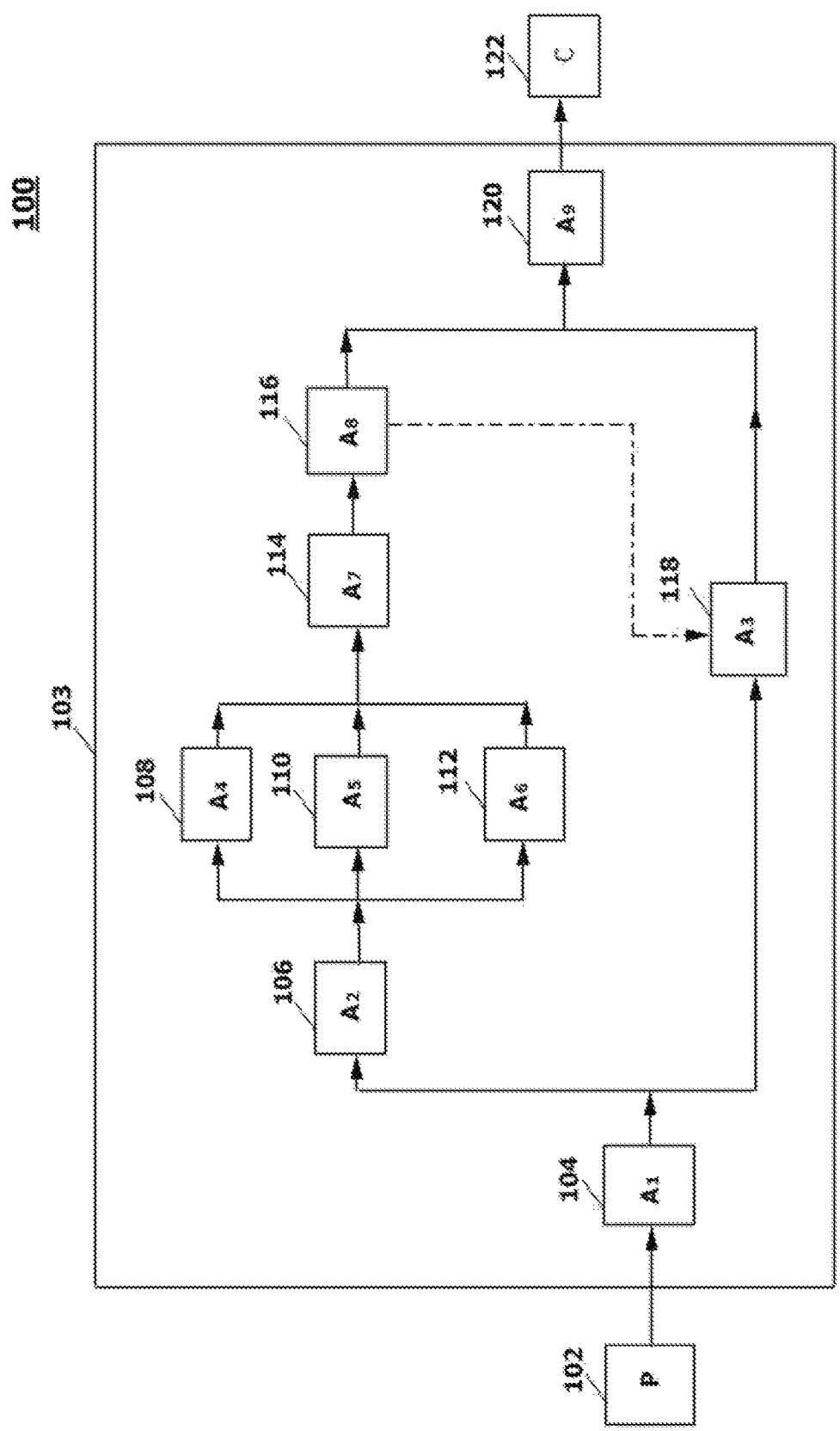
FIG. 1 illustrates an exemplary embodiment of a schematic of an event processing network (EPN)

Embodiments of the invention disclose a method and a system to construct and deploy a hybrid EPN for event processing in a decoupled and distributed manner. A hybrid EPN is configured to perform event processing for an ED system.

Event processing is a process of computing that is performed on events. It may include operations such as reading events, reacting to events by performing actions, modifying events, creating events and destroying events. Processing of events can be classified into various categories. An exemplary embodiment of event processing can be "simple event processing", which includes event transformation, aggregation, splitter, enrichment, filtering, etc. Another exemplary embodiment of event processing may be "complex event processing" and includes relationships between events, for example, event aggregation (a pattern of events implies a higher level event), causality (one event is caused by another), and pattern detection. Yet a further exemplary embodiment of event processing is "stream event processing" that is related to real-time flow of information in and around the enterprise that enables in-time decision making. A type of event processing termed as "intelligent event processing" typically deals with various types of inferences and predictions based on event history and probability.

Analysis of event processing requirements from multiple industry domains, for example including but not limited to Financial Market, Telecom, Healthcare, Automotive, Chemical & Petroleum, Energy, Defense and Retail & Distribution, indicates that a typical solution requires a mix of the different types of event processing capabilities. These capabilities are provided by different sets of software components which may be distributed in the Information Technology (IT) environment.

The hybrid EPN may be defined as partly static (declaratively) and partly dynamic (programmatically), in which nodes can modify the processing path of an event at runtime based on the processing requirements for the event.

In a static EPN, less flexibility exists in terms of changing the flow at runtime. On the other hand, an ED system built with a dynamic EPN may allow the developer to wire EPAs programmatically at runtime but consequently may add programming complexity for the developer as the developers may need to implement the code for wiring even the most basic networks. There is no known method for constructing a hybrid EPN that is simultaneously static and dynamic, which can be modified at runtime based on need and also optimize programming load.

To optimize the programming load, several embodiments of the invention allow a developer to define the EPN declaratively and then allow the user to modify the EPN at runtime through an interface. An example of the interface may be an Application Programming Interface (API). Since this mechanism is generic and is not tied to a particular type of event modeling, several embodiments of the invention create an industry agnostic event modeling and runtime environment (event middleware) for dealing with events and leveraging the multiple processing capabilities which are spread across multiple products. The system is capable of supporting multiple event sources/streams, multiple event type representation and also rules-driven reaction to events.

Several embodiments of the invention may be capable of implementing deterministic completion of event processing across multiple processing agents and may include the capability to change the event processing network by the participating nodes at runtime. This dynamic routing capability to route the event to any processing agent is based on either the event information, processing result at the node and/or consulting an external resource (metadata) like an event registry and repository for details.

Various components of some embodiments of the invention are defined below:

Event Processing Network (EPN)—An EPN defines a network of event processing agents. It is formally represented as a connected graph of nodes and edges as EPN:={N,E}, where 'N' represents a node (vertex) in the graph and 'E' represents an edge in the graph. Further, the node N in the graph may be represented as N:={P, A, C} where 'P' is an event producer (source), 'A' is an event processing agent and 'C' is an event consumer (sink). The edge E in the graph may be represented as E:={(x, y)|x∈S, P; y∈P, C} which is an ordered pair that connects a source or a processing agent to the consumer or another processing agent.

Event Producer (Source)—An event producer represents a real world entity, for example an event source, which produces events.

Event Processing Agent (EPA)—An EPA defines business logic with which the event is to be processed. An EPA typically processes events based on the logic/rules specified and can also generate new events.

Event Consumer—Event consumers model real world entities that consume the event and perform an action on the event.

Event Channel—An event channel (also referred to as an event topic) is a transport for a particular type of event from event producers to different EPAs and finally to the event consumers.

Event Processing Context (EPC)—EPC is the context in which an event is to be processed. EPC is maintained and used by a container. For each event, a unique EPC may be created and this unique EPC may be associated with the event through the entire life cycle of the event. Any processing node can store or access information in the event processing context.

Event Metadata—Event metadata consists of the event type specifications and event processing rules that are made available to event producers, processing agents and subscribers.

Event Router (ER)—Event router is typically a software component that is responsible for loading the EPN definition and routing the events according to the EPN definition. An interface of the event router (ER interface) is used for routing of the events.

FIG. 1 illustrates an exemplary embodiment of an overall schematic 100 of an event processing network (EPN). The EPN consists of an event producer P 102, an event consumer C 122 and a number of exemplary event processing agents EPAs, in this case illustratively indicated as 9 EPAs, $A_1$ 104, $A_2$ 106, $A_3$ 118, $A_4$ 108, $A_5$ 110, $A_6$ 112, $A_7$ 114, $A_8$ 116, and $A_9$ 120 represented, within a block 103. It should be obvious to one skilled in the art that the number of EPAs is not restricted to only nine as illustrated in the exemplary embodiment. The directions of the arrows from P 102 to C 122 indicate the flow of events. When there are more than one EPAs after node $A_i$, for example $A_2$ 106 and $A_3$ 118, after $A_1$ 104, it means there may be a guard condition which will be executed after $A_i$, and based on the outcome of this evaluation the event will be routed to one of the subsequent nodes. The dotted line between $A_8$ 116 to $A_3$ 118 in FIG. 1 indicates that the user needs to route the events conditionally from $A_8$ 116 to $A_3$ 118 at runtime. This routing of the event is typically supported by the ER interface.

Figure 2:
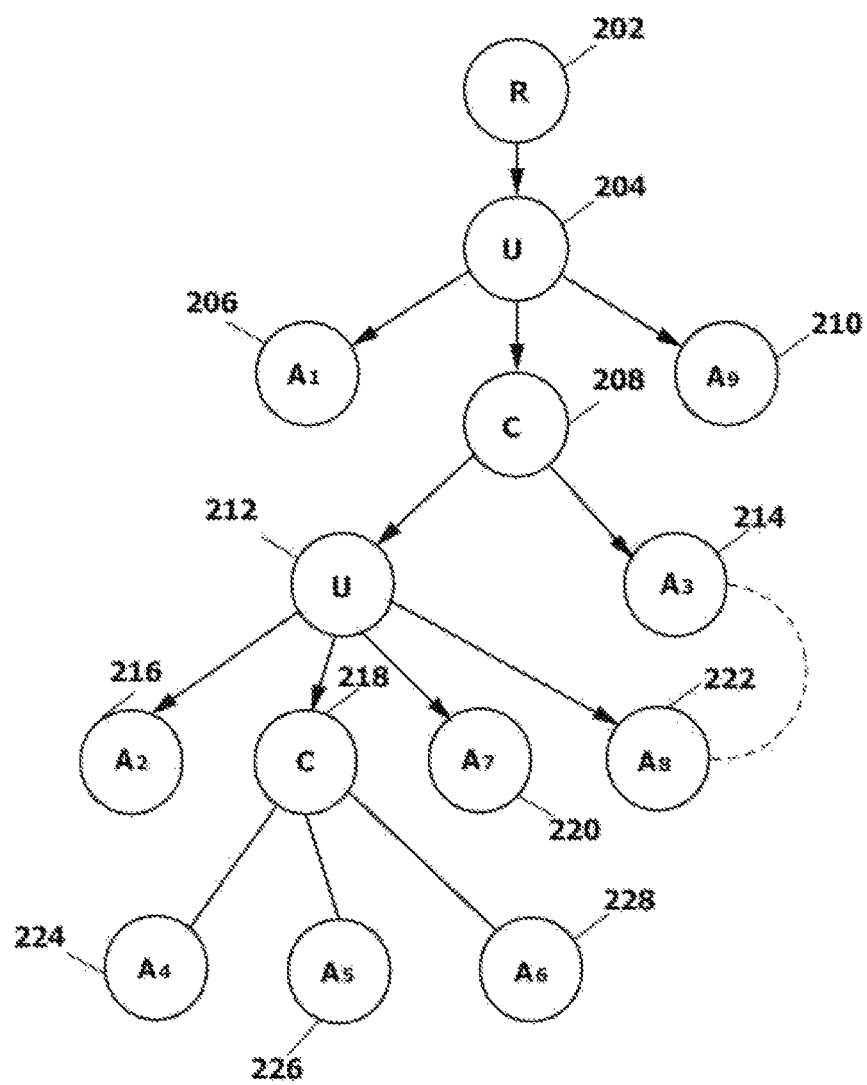
FIG. 2 illustrates an exemplary embodiment of a tree structure of the EPN described in FIG. 1.

FIG. 2 depicts an exemplary embodiment of EPN structure illustrating a tree structure 200 of the EPN 100 described in FIG. 1. The tree structure 200 corresponds to the static part of the EPN defined in FIG. 1. The tree structure 200 may consist of a root node (R) 202, an unconditional execution node (U) 204, 212 and a conditional execution node (C) 208, 218. The nine nodes $A_i$ (206, 216, 214, 224, 226, 228, 220, 222, 210) corresponding to the EPAs of the EPN 100 of FIG. 1 are represented by circles. In an exemplary methodology to traverse the tree structure 200, a modified standard left first algorithm may be used. The algorithm for tree traversal may be modified at a conditional node in such a way that based on the evaluation of a condition, only a single child node in the tree structure is visited, and a sequence of EPAs as specified in the EPN can be obtained. A person skilled in the art will recognizes that the tree structure 200 defined herein is equivalent to the EPN 100 of FIG. 1.

Figure 3:
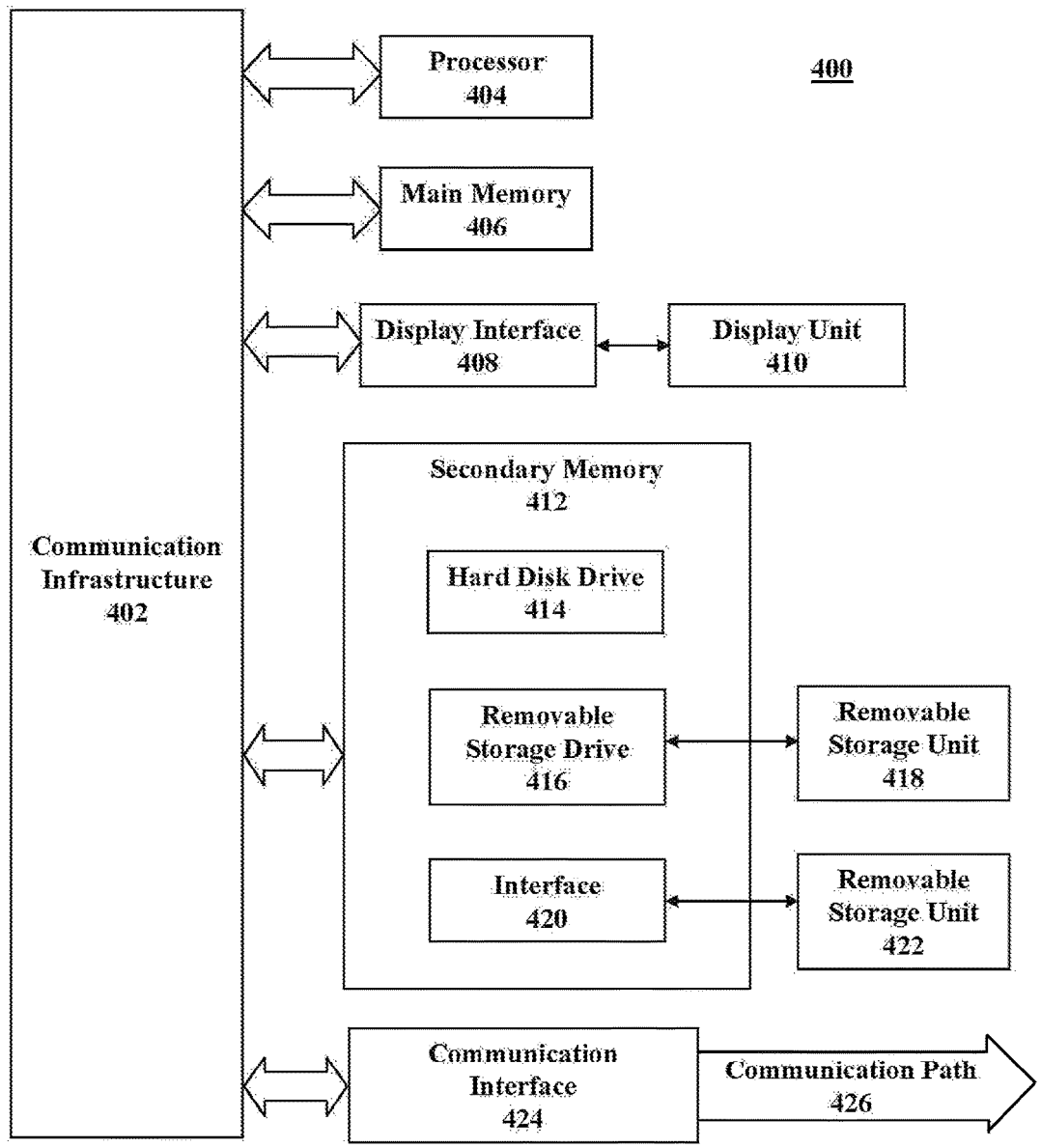
FIG. 3 illustrates an exemplary embodiment of a detailed schematic of an event processing system that uses a hybrid EPN.

FIG. 3 is an exemplary embodiment of a block diagram of a computer system 400 that can be used for implementing various embodiments of the invention described previously. In some embodiments, the computer system 400 can be used as the hybrid EPN 100 of FIG. 1. The Computer system 400 includes a processor 404. It should be understood although FIG. 3 illustrates a single processor, one skilled in the art would appreciate that more than one processor can be included as needed. The processor 404 is connected to a communication infrastructure 402 (for example, a communications bus, cross-over bar, or network). Various software embodiments are described in terms of this exemplary computer system. After reading this description, it will become apparent to a person skilled in the art how to implement the invention using other computer systems and/or computer architectures.

Exemplary computer system 400 can include a display interface 408 configured to forward graphics, text, and other data from the communication infrastructure 402 (or from a frame buffer not shown) for display on a display unit 410. The computer system 400 also includes a main memory 406, which can be random access memory (RAM), and may also include a secondary memory 412. The secondary memory 412 may include, for example, a hard disk drive 414 and/or a removable storage drive 416, representing a floppy disk drive, a magnetic tape drive, an optical disk drive, etc. The removable storage drive 416 reads from and/or writes to a removable storage unit 418 in a manner well known to those having ordinary skill in the art. The removable storage unit 418, represents, for example, a floppy disk, magnetic tape, optical disk, etc. which is read by and written to by the removable storage drive 416. As will be appreciated, the removable storage unit 418 includes a computer usable storage medium having stored therein computer software and/or data.

In exemplary embodiments, the secondary memory 412 may include other similar means for allowing computer programs or other instructions to be loaded into the computer system. Such means may include, for example, a removable storage unit 422 and an interface 420. Examples of such may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to the computer system 400.

The computer system 400 may also include a communications interface 424. The communications interface 424 allows software and data to be transferred between the computer system and external devices. Examples of the communications interface 424 may include a modem, a network interface (such as an Ethernet card), a communications port, a PCMCIA slot and card, etc. Software and data transferred via the communications interface 424 are in the form of signals which may be, for example, electronic, electromagnetic, optical, or other signals capable of being received by communications interface 424. These signals are provided to the communications interface 424 via a communications path (that is, channel) 426. The channel 426 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as the main memory 406 and the secondary memory 412, the removable storage drive 416, and a hard disk installed in the hard disk drive 414. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may allow a computer to read such computer readable information.

Computer programs (also referred to herein as computer control logic) are stored in the main memory 406 and/or the secondary memory 412. Computer programs may also be received via the communications interface 424. Such computer programs, when executed, can enable the computer system to perform the features of exemplary embodiments of the present invention as discussed herein. In particular, the computer programs, when executed, enable the processor 404 to perform the features of the computer system 400. Accordingly, such computer programs represent controllers of the computer system.

Figure 4:
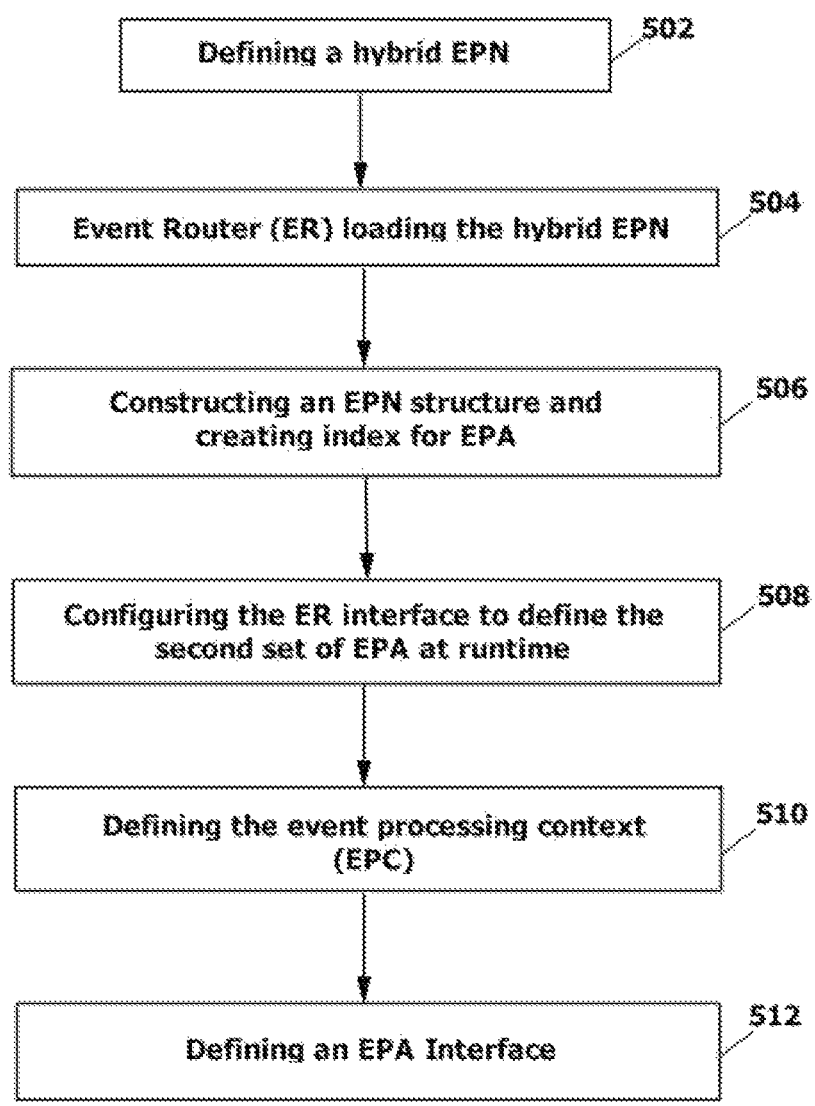
FIG. 4 illustrates an exemplary embodiment of a flow-chart of creation of the hybrid EPN.

FIG. 4 illustrates an exemplary embodiment of a flowchart 500 of creation of the hybrid EPN 100 as shown in FIG. 1. In step 502 a first set of EPAs is declaratively defined and a second set of EPAs is dynamically defined. Creation of the hybrid EPN 100 also further includes creating an interface for dynamically modifying the second set of EPAs at runtime. Once the static part (declaratively defined) and the dynamic part (programmatically defined) of the hybrid EPN are identified, in step 504 the hybrid EPN is loaded by an event router (ER). In step 506, the ER further constructs an EPN structure, as an example a tree structure, of the hybrid EPN and in one embodiment includes creating indexes for the EPA of the hybrid EPN. In step 508 the second set of EPAs is dynamically defined at runtime using the ER interface. In step 510 the EPC is defined, and the EPC includes a pointer to the EPA of the hybrid EPN. In step 512, an EPA interface for at least one EPA of the hybrid EPN is defined. The EPA interface is configured to modify an event flow of the hybrid EPN. In step 512, the hybrid EPN is ready to be used for event processing.

Figure 5:
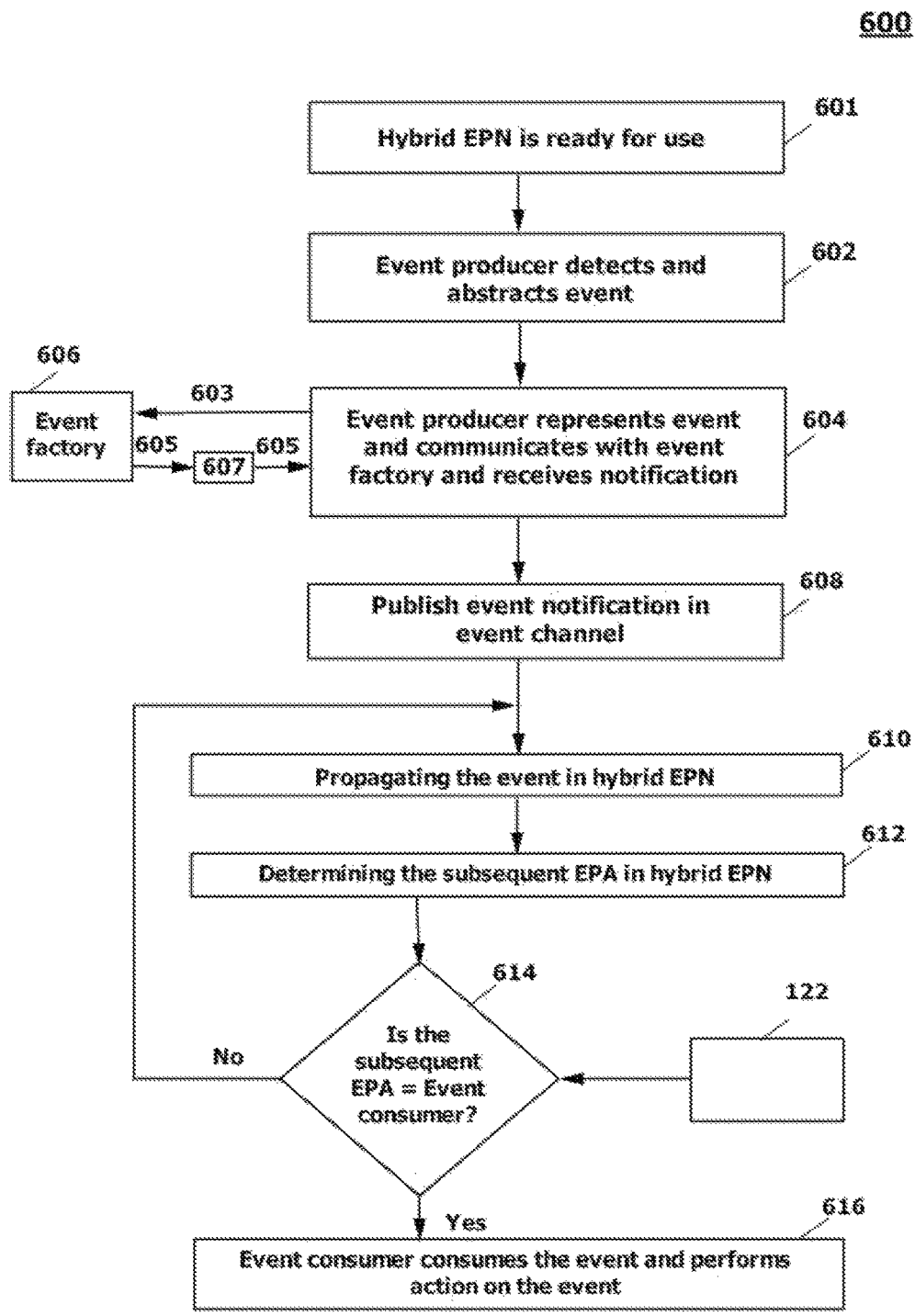
FIG. 5 illustrates an exemplary embodiment of a flow chart of deploying the hybrid EPN to dynamically route events at runtime wherein an exemplary hybrid EPN is built according to FIG. 4.

FIG. 5 illustrates an exemplary embodiment of a flowchart 600 of deploying the hybrid EPN built at the end of step 512 of FIG. 4, specifically in an embodiment when the hybrid EPN is ready to be used for event processing. The hybrid EPN is used to dynamically route events at runtime. To facilitate identification of any node by a unique identifier, for example that specified by the user while defining the EPN, and route the event to that particular node, the ER also creates an index of the nodes in the tree based on the unique identifier of the EPA, which is prepared by the ER while loading the EPN and converting the EPN into a tree structure. This index is available with the ER.

Step 601 depicts that the hybrid EPN is ready for use. When a physical event occurs at the event source, in step 602 an event producer detects and abstracts the event occurrence at an event source. In step 604, the event producer represents the event and communicates the event to the event factory 606 via 603. Further in step 604, the event producer receives an event notification 607 via 605 from the event factory 606. The event notification 607 wraps the event information within itself. Event factory 606 also generates the EPC. The EPC is unique for a given event and remains associated with the event during the entire life-cycle of the event. The EPC also has a pointer to the next EPA (subsequent EPA) that is required to process the event.

Initially, the pointer is not set. When the EPC is created, the value of this pointer will be set to null. In step 608, the event producer publishes the event notification 607 into the event channel for a given event type. The event channel then forwards the event to the associated ER. In step 610, the event is propagated in the hybrid EPN. In step 612, the subsequent EPA associated with the event within the hybrid EPN is determined. The ER checks with the EPC to find out the subsequent EPA to process the event in the current stage.

In an exemplary embodiment, processing of certain conditions in step 612 is described below:
A. If the pointer to the subsequent EPA is null, the pointer to the root element of the tree structure is set and then the event is pushed to the channel; else
B. If the pointer to the subsequent EPA is not null, then check the type of the node in the tree structure.
  i. If the previous EPA has overridden the pointer in the context (using the override API), break any loops and push the event to the channel; else
  ii. if the node is a non-leaf node of the tree structure, determine if this non-leaf node is a conditional node or unconditional node.
    a. if the non-leaf node is a conditional node, then execute the condition, and set the pointer to the resulting EPA and push the event to the channel.
    b. if the non-leaf node is an unconditional node, for each child element from left to right, set the pointer to the child element and push the event to the channel; else
  iii. if the node is a leaf node, then route the event to that EPA. If the EPA needs to modify the routing path, the EPA can invoke the override API of the ER.

Having identified the subsequent EPA using the logic of step 612, in step 614 a check is made to determine where the last element (event consumer) in the EPN has been reached. If the subsequent EPA in step 612 is the last element (event consumer) in the EPN, then the step 616 depicts that the event consumer 122 of FIG. 1 consumes the event and performs the action on the event. If the subsequent EPA is not the event consumer 122 of FIG. 1, then the event is further propagated to the subsequent EPA of the hybrid EPN as described in step 610.

An embodiment of the invention further provides a storage medium tangibly embodying a program of machine-readable instructions to carry out a method constructing the EPN, the EPN including the EPA, as described in the various embodiments set forth above and described in detail.

In an embodiment of the invention, no two EPAs or nodes will be communicating directly with each other. The events are pushed through event channels and EPAs receive the events of their interest. It is the responsibility of the next event EPA to pull the events of interest from the specific channels retaining the decoupled behavior of the system. In one or more embodiments of the invention, the initial tree structure that is built may act as an index for each EPA to query on the other available EPAs and accordingly determines the dynamic routing needed to fulfill the need.

The terminology used herein is for the purpose of describing exemplary embodiments and is not intended to be limiting of the present invention. As used herein, the singular forms "a", "an", and "the" are intended to include the plural forms as well, unless the context clearly indicates otherwise. It will be further understood that the terms "comprises", "comprising", "includes", or "including" when used in this specification, specify the presence of stated features, integers, steps, operations, elements, and/or components, but do not preclude the presence or addition of one or more other features, integers, steps, operations, elements, components, and/or groups thereof.

While exemplary embodiments of the invention have been described, it will be understood that those skilled in the art, both now and in the future, may make various improvements and enhancements which fall within the scope of the claims that follow. These claims should be construed to maintain the proper protection for the invention first described.

What is claimed is:

1. A computer-implemented method within an event processing network (EPN) including a plurality of event processing agents (EPAs), comprising:
   adding, to the EPN, a first EPA of a statically-configured type EPA that is not subject to being reconfigured at EPN runtime;
   adding, to the EPN, a second EPA of a dynamically-configurable type EPA that is subject to being reconfigured at EPN runtime;
   starting EPN runtime;
   dynamically configuring, subsequent to starting EPN runtime, the second EPA;
   receiving, subsequent to starting EPN runtime, an event data set including information indicative of an event to be processed by the EPN; and
   processing the event by:
      processing at least a portion of the event data set by the first EPA, and
      processing at least a portion of the event data set by the second EPA.

2. The method of claim 1, wherein
the dynamic configuration of the second EPA is based, at least in part, upon characteristic(s) of the event.

3. The method of claim 1, wherein
an event router is configured to create an index and an EPN structure of the EPN.

4. The method of claim 1, further comprising
defining an event processing context including a pointer to an EPA of the EPN.

5. The method of claim 1, further comprising
defining an event processing agent interface for an event processing agent of the EPN.

6. The method of claim 5, wherein
the event processing agent interface is configured to modify an event flow of the EPN.

7. The method of claim 1, wherein
an EPA defines logic by which the event is to be processed.

8. A computer hardware system associated with an event processing network (EPN) including a plurality of event processing agents (EPAs), comprising:
   a hardware processor configured to initiate the following operations:
      adding, to the EPN, a first EPA of a statically-configured type EPA that is not subject to being reconfigured at EPN runtime;
      adding, to the EPN, a second EPA of a dynamically-configurable type EPA that is subject to being reconfigured at EPN runtime;
      starting EPN runtime;

dynamically configuring, subsequent to starting EPN runtime, the second EPA;
receiving, subsequent to starting EPN runtime, an event data set including information indicative of an event to be processed by the EPN; and
processing the event by:
  processing at least a portion of the event data set by the first EPA, and
  processing at least a portion of the event data set by the second EPA.

9. The system of claim 8, wherein
the dynamic configuration of the second EPA is based, at least in part, upon characteristic(s) of the event.

10. The system of claim 8, wherein
an event router is configured to create an index and an EPN structure of the EPN.

11. The system of claim 8, wherein the hardware processor is further configured to initiate the following operation:
defining an event processing context including a pointer to an EPA of the EPN.

12. The system of claim 8, wherein the hardware processor is further configured to initiate the following operation:
defining an event processing agent interface for an event processing agent of the EPN.

13. The method of claim 12, wherein
the event processing agent interface is configured to modify an event flow of the EPN.

14. The method of claim 8, wherein
an EPA defines logic by which the event is to be processed.

15. A computer program product, comprising:
a hardware storage device having stored therein machine-readable instructions,
the machine-readable instructions, which when executed by a computer hardware system associated with an event processing network (EPN) including a plurality of event processing agents (EPAs), causes the computer hardware system to perform:
  adding, to the EPN, a first EPA of a statically-configured type EPA that is not subject to being reconfigured at EPN runtime;
  adding, to the EPN, a second EPA of a dynamically-configurable type EPA that is subject to being reconfigured at EPN runtime;
  starting EPN runtime;
  dynamically configuring, subsequent to starting EPN runtime, the second EPA;
  receiving, subsequent to starting EPN runtime, an event data set including information indicative of an event to be processed by the EPN; and
  processing the event by:
    processing at least a portion of the event data set by the first EPA, and
    processing at least a portion of the event data set by the second EPA.

16. The computer program product of claim 15, wherein
the dynamic configuration of the second EPA is based, at least in part, upon characteristic(s) of the event.

17. The computer program product of claim 15, wherein
an event router is configured to create an index and an EPN structure of the EPN.

18. The computer program product of claim 15, wherein the machine-readable instructions further cause the computer hardware system to perform:
defining an event processing context including a pointer to an EPA of the EPN.

19. The computer program product of claim 15, wherein the machine-readable instructions further cause the computer hardware system to perform:
defining an event processing agent interface for an event processing agent of the EPN, wherein
the event processing agent interface is configured to modify an event flow of the EPN.

20. The computer program product of claim 15, wherein
an EPA defines logic by which the event is to be processed.

* * * * *